United States Patent [19]
Whitmore

[11] Patent Number: 6,027,633
[45] Date of Patent: Feb. 22, 2000

[54] ELECTROLYTIC RESTORATION OF CONCRETE

[76] Inventor: David W. Whitmore, 38 Kings Drive, Winnipeg, Manitoba, Canada, R3T 3E5

[21] Appl. No.: 09/153,900

[22] Filed: Sep. 16, 1998

[51] Int. Cl.[7] ................................................ C23F 13/00
[52] U.S. Cl. ........................................ 205/734; 205/739
[58] Field of Search ..................................... 205/734, 739

[56] References Cited

U.S. PATENT DOCUMENTS

| | | | |
|---|---|---|---|
| 5,141,607 | 8/1992 | Swiat ..................................... | 204/196 |
| 5,228,959 | 7/1993 | Miller ..................................... | 205/734 |
| 5,296,120 | 3/1994 | Bennett et al. ........................ | 204/196 |
| 5,312,526 | 5/1994 | Miller ..................................... | 205/734 |
| 5,650,060 | 7/1997 | Huang et al. .......................... | 205/734 |

OTHER PUBLICATIONS

Norcure brochure "Is Salt Induced Corrosion Causing Problems with your Concrete Structures?" no month/year Available.

Vector brochure "The Concrete Restoration and Protection Specialists" no month/year Available.

Norcure brochure "Changing the face of concrete repair" no month/year available.

*Primary Examiner*—Bruce F. Bell
*Attorney, Agent, or Firm*—Adrian D. Battison; Murray E. Thrift

[57] ABSTRACT

An electrolytic restoration of concrete includes an anode positioned at a surface of the concrete to be restored and the communication of a current from the anode to the reinforcing bars in the concrete as a cathode. The anode is in the presence of or carries an electrolyte so that sufficient current is provided temporarily over a sufficient period of time so that ions from the concrete are carried through the concrete and expelled into the electrolyte for extraction. The anode is provided by layer of conductive material which is particulate or fibrous so that it is an amorphous layer which can therefore follow the surface of the concrete. In a horizontal arrangement, the layer can be applied directly onto a felt mat for carrying electrolyte. In a vertical orientation an initial layer of chopped cellulose is wetted and applied onto the vertical surface followed by the same layer carrying carbon powder so that the layer is conductive and forms the anode when connected to metal connector plates buried in the anode layer.

22 Claims, 2 Drawing Sheets

ELECTROLYTIC RESTORATION OF CONCRETE

This invention relates to a method for electrolytic restoration of concrete.

BACKGROUND OF THE INVENTION

It is known that concrete can be restored by generating movement of ions within the concrete structure between an anode located on the exterior of the concrete structure and a cathode defined by the conventional metal reinforcing members within the concrete. An electrolyte is carried in a porous material between the outside surface of the concrete and the anode.

Various restorative effects can be obtained using this method including particularly the extraction of chloride ions from the concrete which would otherwise cause corrosion of the metal reinforcement leading to degradation of this structure and spalling of the concrete material covering the reinforcing members.

Examples of this method are shown and described in detail in a brochure by Norcure Chloride Removal Systems Inc. entitled "Is Salt Induced Corrosion Causing Problems with your Concrete Structures", in a brochure by Vector Construction entitled "The Concrete Restoration and Protection Specialists" and in a brochure by "Fosroc/NCTAS" entitled "Norcure Desalination". These brochures describe a technique which is used for various concrete structures including bridge decks and the brochure by Fosroc shows particularly a technique in which a bridge deck is restored using this anodic method.

In the brochure and as generally used in practice, after the concrete surface is exposed by removal of any covering layers, a porous material is laid down onto the upper surface and this receives an electrolyte. The porous material is then covered by a mesh type electrode in the form of wire netting which is then covered by a further layer of the porous material.

A current supply is connected between the mesh anode and the reinforcing steel of the concrete and over an extended period of many weeks this acts to cause transfer of ions from the concrete material through the electrolyte to provide a restorative effect.

However the conventional technique using the layers of porous material and the wire mesh anode require that the bridge deck be placed out of operation for the extended period of the restoration. While this can be accommodated in some cases, it does of course severely restrict traffic flow.

The increased usage of salt as a de-icing agent in freezing conditions has severely exacerbated the problem of chloride degradation of concrete.

Up till now, therefore, in practice it has not been possible to operate this technique without the necessity for closing the concrete structure to passing vehicles or traffic and this disadvantage has significantly reduced the use of this restorative technique.

U.S. Pat. No. 5,296,120 (Bennett et al assigned to ELTECH Systems Corporation and issued Mar. 22, 1994) discloses an anode system for use in the above method. However this technique as disclosed in the patent has achieved little or no commercial success and has in effect been abandoned. The main disclosure of the patent relates to an anode construction which can be rolled into a supply roll for transportation and then can be unrolled into place. The anode is provided by a mesh of a suitable metal, preferably a film forming valve metal base which is combined into a structure including one or more layers of cellulose and polymeric foams. The patent also mentions that the foam layer can be made conductive by the addition of a conductive material such as carbon powder. However this is intended to be used with the metal mesh anode simply to enhance conductivity.

A further example is disclosed in U.S. Pat. No. 5,141,607 issued Aug. 25th 1992 (Swiat assigned to Corrpro Companies Inc) which discloses an anode which is of the mesh-type embedded within a porous material.

Restoration of concrete using a temporary current is an entirely different process from impressed current cathodic protection. In the latter process, a small current of the order of 1–10 mAmps/sq meter is caused to flow continuously through the life of the concrete for the purpose of inhibiting corrosion.

The current used in the restoration process is strictly temporary for a period of the order of 20 to 90 days and has a value which of the order of 50 to 200 TIMES that of the continuous current. Thus the current in the restoration process may lie in the range 0.4 to 3.0 Amps/sq meter. In addition, the process of restoration must include a liquid electrolyte whereas the continuous process is dry. Therefore the types of anode and materials to be used are of an entirely different character.

It is however known that a continuous current for cathodic protection to inhibit corrosion can be generated using a conductive asphalt in which a carbon powder has been added to provide the necessary conductivity.

SUMMARY OF THE INVENTION

It is one object of the present invention, therefore to provide an improved electrolytic restoration method.

According to one aspect of the invention there is provided a method for restoration of concrete comprising:

providing a concrete member having an outer surface and metallic reinforcing elements beneath the surface;

placing on the outer surface an electrically conductive member;

connecting an electrical current between the metallic reinforcing elements as a cathode and the electrically conductive member as an anode so as to cause the current to flow therebetween;

providing an electrolyte between the anode and the outer surface so that the current causes movement of ions between the anode and the cathode within the concrete;

providing the electrically conductive member in the form of a conductive layer of material including discrete conductive elements such that the layer is conductive without the inclusion of a continuous conductive anode element;

and connecting the current to the layer by at least one connector embedded in the layer sufficiently to communicate the current thereto;

said connector being arranged to cover only a minor portion of the outer surface such that the current is communicated to the outer surface by passing along and through the layer;

the layer being applied as an unformed mass of the material which is spread over the outer surface to a required thickness and so as to conform to a shape of the outer surface;

the current being sufficient to cause extraction of ions from the concrete into the electrolyte for restoration of the reinforcing elements.

Preferably the conductive elements are particulate or fibrous, that is the conductive elements are small discrete portions such as carbon powder or granules which do not by themselves span any significant part of the outer surface but are collected together in an amorphous mass or layer to form the conductive layer to define an anode suitable to transmit the necessary current.

In one embodiment the layer is formed substantially wholly by the conductive elements, that is it is simply a poured or spread layer of the powder of fibres without additional binding materials. In this arrangement, the outer surface is substantially horizontal and the conductive elements are spread as a layer of substantially constant thickness so as to follow the shape of the outer surface.

Preferably an electrolyte support layer is applied onto the outer surface and the conductive layer is applied on top of the support layer. This clearly separates the conductive layer from the surface and also makes clean up of the materials easier after the process is complete.

In an alternative arrangement, the conductive layer comprises a mixture of the conductive elements and a support material and this is particularly used where the outer surface includes at least parts which are substantially vertical and the conductive elements are held attached to the outer surface by the support material. The support layer is preferably formed from the same support material as the conductive layer.

Preferably the support material of the support layer and the conductive layer is a chopped cellulose material applied to the outer surface by a jet of the support material mixed with a liquid carrier such as water. The conductive elements are carbon particles mixed with the cellulose.

Preferably the connectors comprise metal plates which are covered on a side adjacent the outer surface and on a side remote from the outer surface by the conductive layer.

Preferably the electrolyte is a liquid and contains additives such as calcium hydroxide for treating the concrete.

In another preferred arrangement, the conductive layer includes with said conductive elements a support material such as asphalt allowing the conductive layer to be driven over by vehicular traffic.

Preferably there is provided a porous layer under the conductive layer through which the electrolyte can pass or the support material and the conductive layer is sufficiently porous to allow the penetration therethrough of the electrolyte to the outer surface.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

An existing concrete structure is indicated in the figures at 10 and includes a cast layer of concrete 11 receiving an upper grid of reinforcing bars 12 and a lower grid of reinforcing bars 13. The concrete provides an outer or upper surface 14 which is exposed.

Figure 1:
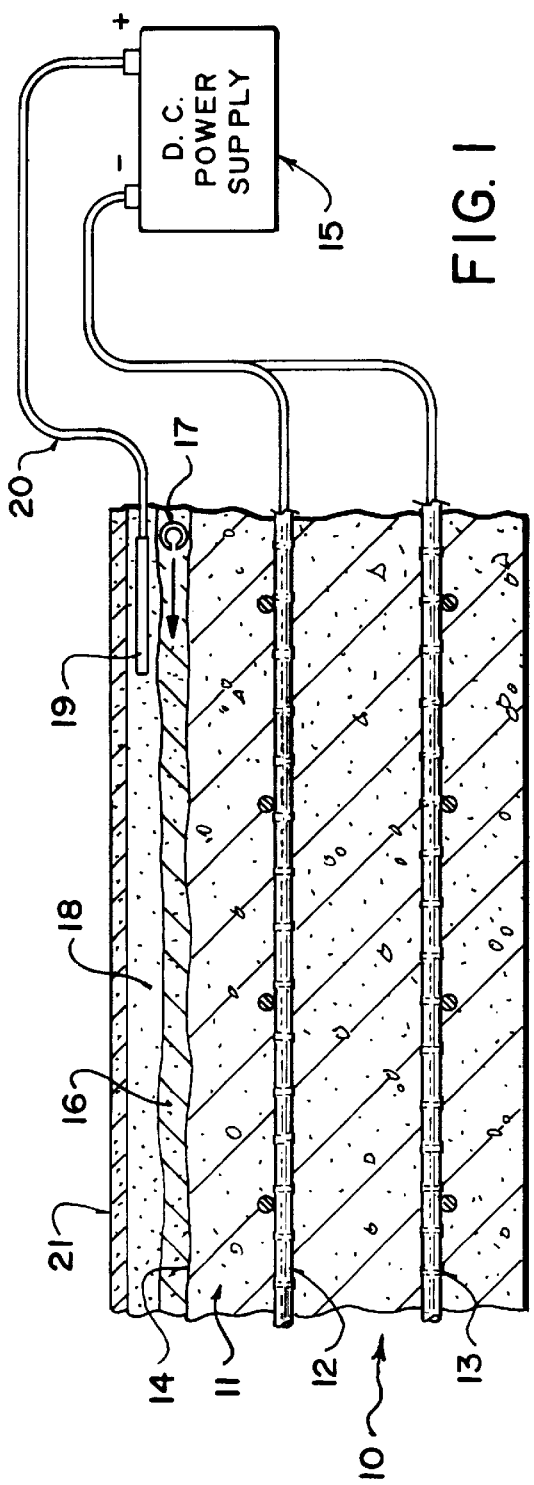
FIG. 1 is a cross sectional view showing schematically a method for restoration of concrete according to the present invention.
Figure 2:
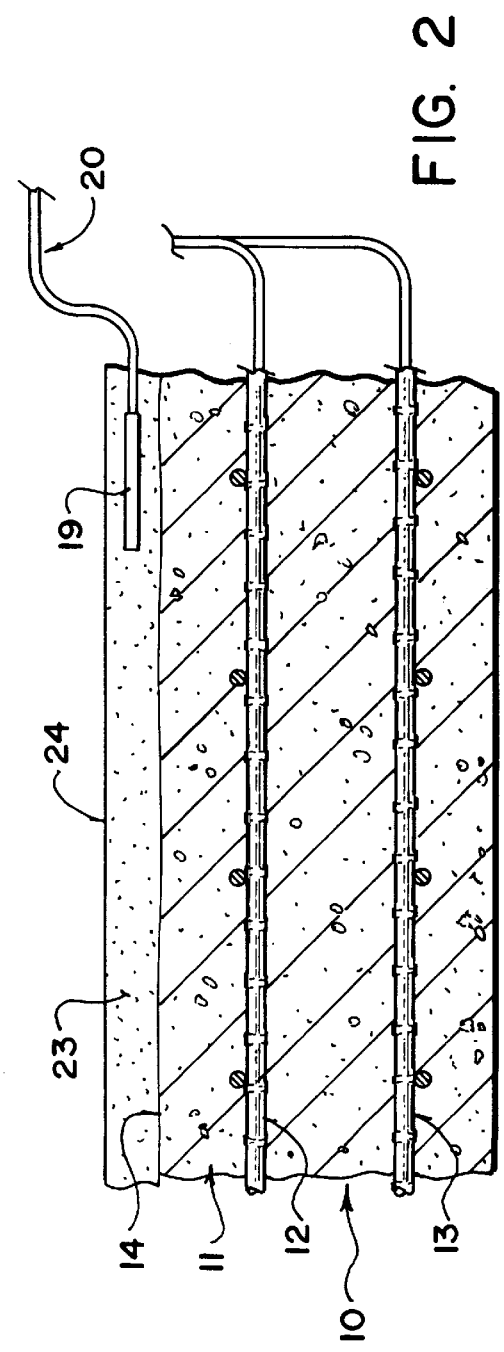
FIG. 2 is a similar cross sectional view to that of FIG. 1 showing a modified arrangement.
Figure 3:
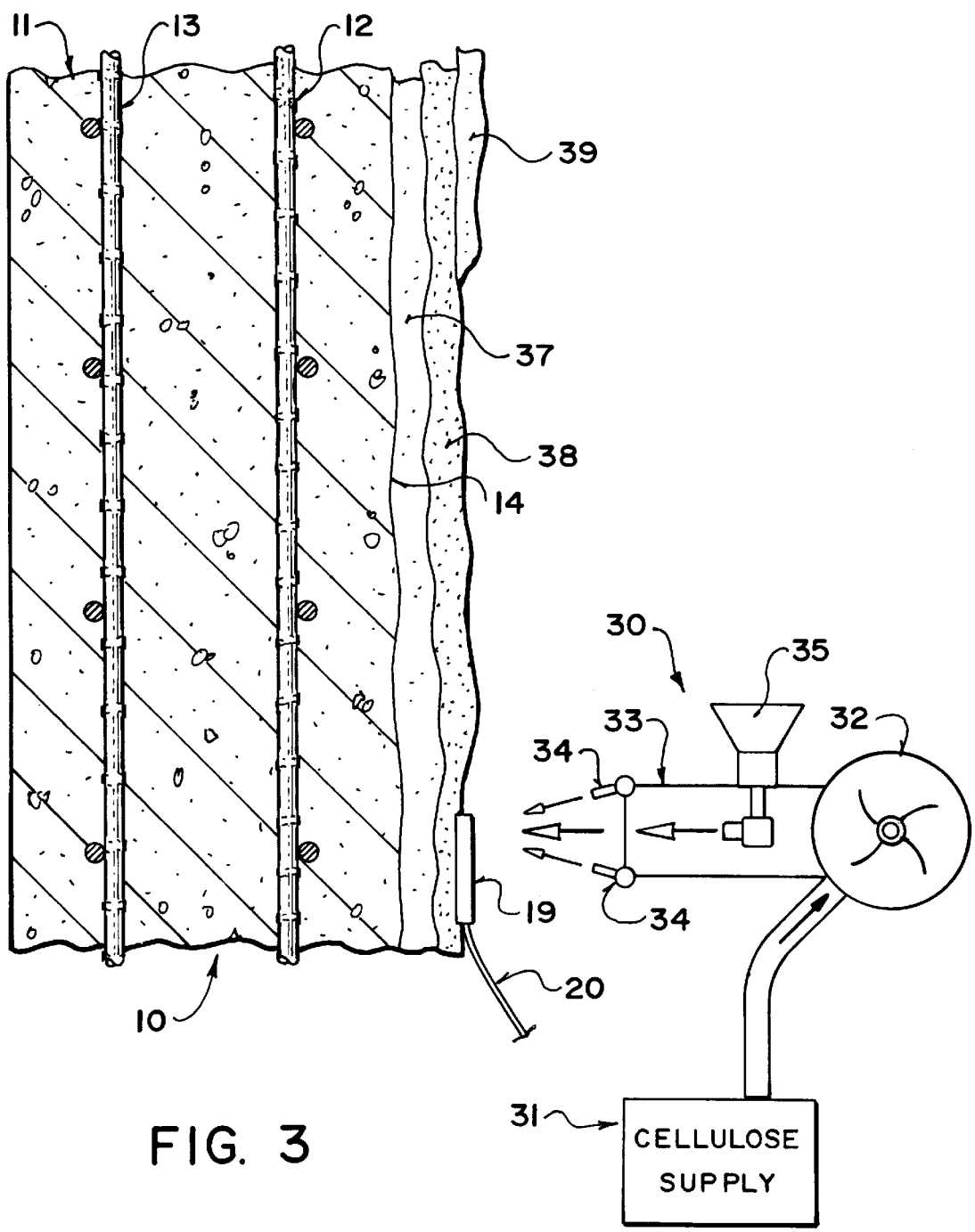
FIG. 3 is a yet further cross sectional view similar to that of FIGS. 1 and 2 showing a yet further modified arrangement.

In FIGS. 1 and 2 the concrete provides a horizontal layer so the upper surface 14 is horizontal and the reinforcing bars 12 and 13 are similarly horizontal and parallel to the upper surface. In FIG. 3 the surface 14 is vertical or generally upright and the reinforcing bars 12 and 13 are also similarly generally upright and parallel to the surface 14. The surface 14 may include parts which are horizontal or overhead facing downwardly but is not generally intended to be wholly horizontal such as the underside of a deck.

The method for restoring concrete structures of this type is previously known in that a DC power supply 15 is connected across an anode at the surface 14 and to the reinforcing bars 12 and 13 at a cathode. The power supply and the anode are arranged to generate a current which is substantially the maximum which can be economically achieved using the maximum allowable voltage of the order of 40 volts which is allowed without special permits or processing. Normally this will lead to a current in the range 0.25 to 5 Amps/sq meter for a temporary period which can lie in the range 10 to 90 days. The amount of the current will vary depending upon the thickness of the concrete, the resistivity of the anode, the ion content of the concrete and other factors well known to one skilled in this art.

It is well established that a current of this magnitude for this time period will cause negative ions primarily chlorides to transfer from the concrete to the surface 14 where those ions escape from the surface and are collected in an electrolyte at the anode while positive ions such as lithium are transferred in the opposite direction to replace them. The negative ions are generally chloride ions and are extracted from the concrete particularly from the area adjacent the reinforcing bars so as to halt or reduce the corrosion of the reinforcing bars.

In the embodiment of FIG. 1, there is provided a porous, permeable electrolyte carrying layer 16 which receives a liquid electrolyte from a supply duct 17 allowing the electrolyte to pass through the porous layer across the surface 14. The porous layer can be a mat of felt or similar material which can be laid across the surface 14. Electrolyte can be supplied from a pipe where the pipe dribbles the electrolyte continuously into the layer so that it passes through the layer across the surface for collection at a lower edge of the surface. In other cases, the electrolyte can be supplied simply by applying additional electrolyte periodically when required to maintain a level of electrolyte within the layer 16.

On top of the permeable, porous layer 16 is applied the anode 18 in the form of a poured and spread layer of a conductive material.

The conductive material is preferably carbon powder which is sufficiently conductive and readily available. However other electrically conductive materials in particulate form can be used such as zinc, steel or aluminum. The material is not necessarily particulate since fibres can also be used but the material is of a character which allows it to be poured and spread so that there is no inherent structural layer which is carried or laid into place. The pouring and spreading of powder can therefore readily follow any shape of the surface 14 since there is no rigidity in the layer nor any particular dimensions of the layer since the material can be spread to any dimensions which are required.

In contact with the anode is provided a connector plate 19 in the form a relatively small metal plate connected through a wire 20 to the power supply 15. The plate 19 is preferably buried in that there is a portion of the layer 18 underneath the plate and a further portion on top of the plate. The plate has dimensions which are selected relative to the amount of the material to provide sufficient electrical connection between the layer 18 and the plate without generating high levels of resistance in the connection therebetween.

In general a connector plate of the order of 10 to 100 square inches can be provided and this is preferably sufficiently thick to be relatively stiff since this can be simply dropped into place onto an initial portion of the layer after the layer is formed and then further parts of the layer spread over the plate to ensure electrical connection. However the connector plate can also be formed of a plate of steel, cast iron or similar material. Titanium in the form of ribbon or mesh can also be used. A commercially available cast iron tube can also be used as this is supplied for use in cathodic protection of underground pipes and therefore already carries the necessary electrical connections.

In practice connectors will be provided at spaced positions across the layer so as to ensure a consistent flow of current from the anode into the concrete.

The application of the anode is therefore very straightforward in that the volume of conductive material necessary can be readily calculated based upon the known area to be covered and the required thickness of the anode. The thickness of the anode will vary in dependence upon the conductivity of the material selected and the spacing of the connector plates. In practice the anode has a thickness in the range 0.125 to 2.0 inches depending upon the above factors.

The volume of conductive material is then spread over the area to be restored so as to reach the required thickness with the connector plates being buried within or located on the layer at the required positions spaced across the layer.

In order to prevent the layer from being dispersed by wind, rainfall, flowing water or by physical contact, a covering layer 21 can be applied over the anode. The covering layer can be a layer of plastics material which simply lies over the anode and prevents direct action on the anode by the elements. The covering layer can be more rigid such as sheeting. The covering layer can be a thin layer of asphalt or similar material which allows the anode to remain in place while traffic can pass directly over the layer 21 without interfering with the anode layer.

In FIG. 1 the layer 18 is formed substantially wholly from the particulate or fibrous conductive material without the necessity for a carrier material.

In FIG. 2, there is applied over the surface 14 a mixed layer 23 of a carrier or support material with the conductive material mixed into that carrier layer. Thus for example the carrier material may be asphalt into which is mixed a sufficient quantity of conductive carbon powder to render the asphalt layer conductive. The conductivity is arranged relative to the metal contact plate 19 so as to generate the level of current set forth above. The thickness of the asphalt layer can be of the order of 1 to 4 inches, typically 2 to 3 inches. The amount of carbon powder mixed with the asphalt can be of the order of 25 to 50% so as to generate a resistance of the order of 1 to 10 $\Omega$-cm. Other carrier materials can be cement or polymer resin binders.

The asphalt layer thus can allow traffic to pass directly over the surface 14. The asphalt layer is however arranged to be porous so that electrolyte, generally water, can be supplied to the surface 14 either through the upper surface 24 of the layer or through supply pipes buried within the layer. Thus the lower parts of the layer 23 are filled or saturated with the electrolyte allowing the ions from the concrete to enter into the electrolyte within the porous layer 23 for extraction from the concrete.

In FIG. 3 is shown a further modified arrangement for use generally with vertical concrete structures so that the surface 14 is generally upright.

It is known that in most such vertical operations, an anode is buried within a layer of cellulose which is applied onto the surface 14 from a jet system generally indicated at 30. The known jet system comprises a supply 31 of cellulose which is carried by a chopper/fan arrangement 32 for jet supply through a nozzle 33 toward the surface 14. At the mouth of the nozzle is provided liquid supply nozzles 34 which mix the cellulose with a water supply in a jetting action so that when the mixed material meets the surface 14 is applied as a coating layer of wet cellulose. This coating layer has sufficient bonding capability to attach to the surface 14 and to attach to itself as the layer is built up.

In the system of the present invention, in one embodiment, an additional supply container 35 is provided which contains a conductive material such a the carbon powder previously described which is injected into the nozzle 33 so as to be carried with the cellulose from the jet mouth. The carbon powder is therefore intimately mixed with the chopped cellulose and with the water at the nozzle 34 so that the mixture emerging from the mouth of the jet can be applied onto the existing layer 37 as a further conductive layer 38. Alternatively, the carbon powder can be pre-mixed with the cellulose in a separate operation.

The metal connector plate 19 is inserted onto a part of layer 38 so that it is then covered by the application of further material. The final layer 39 of the cellulose without the conductive carbon particles can be applied on top of the layer 38 if required.

In this way a composite layer is applied onto the surface 14 and is attached to the surface 14 by its bonding effect. The conductive portion 38 of the layer follows any complexity in the shaping of the surface 14. The portion 38 of the layer remains attached to the surface by the bonding effect and it has no tendency to pull away from the surface 14 due to any resilience since it has no resilience and is simply an amorphous layer.

In all embodiments, the anode is thus formed substantially wholly by the layer of conductive material and the connector plates cover only a small proportion of the area of the surface 14. There is no additional anode material in the form of metal mesh or elements extending across the surface 14.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for restoration of concrete comprising:

providing a concrete member having an outer surface and metallic reinforcing elements beneath the surface;

placing on the outer surface an electrically conductive member;

connecting an electrical current between the metallic reinforcing elements as a cathode and the electrically conductive member as an anode so as to cause the current to flow therebetween;

providing an electrolyte between the anode and the outer surface so that the current causes movement of ions between the anode and the cathode within the concrete;

providing the electrically conductive member in the form of a conductive layer of material including discrete conductive elements such that the layer is conductive without the inclusion of a continuous conductive anode element;

and connecting the current to the layer by at least one connector embedded in the layer sufficiently to communicate the current thereto;

said connector being arranged to cover only a minor portion of the outer surface such that the current is communicated to the outer surface by passing along and through the layer;

the layer being applied as an unformed mass of the material which is spread over the outer surface to a required thickness and so as to conform to a shape of the outer surface;

the current being sufficient to cause movement of ions between the concrete and the electrolyte for restoration of the reinforcing elements.

2. The method according to claim 1 wherein the conductive elements are particulate.

3. The method according to claim 1 wherein the conductive elements are fibrous.

4. The method according to claim 1 wherein the layer is formed substantially wholly by the conductive elements.

5. The method according to claim 1 wherein the conductive elements comprise carbon powder.

6. The method according to claim 1 wherein the conductive layer comprises a mixture of the conductive elements and a support material.

7. The method according to claim 6 wherein the conductive layer consists solely of the conductive elements.

8. The method according to claim 1 wherein an electrolyte support layer is applied onto the outer surface and the conductive layer is applied on top of the support layer.

9. The method according to claim 8 wherein outer surface is substantially horizontal and wherein the conductive elements are spread as a layer of substantially constant thickness so as to follow the shape of the outer surface.

10. The method according to claim 8 wherein the conductive layer comprises a mixture of the conductive elements and a support material.

11. The method according to claim 10 wherein the outer surface includes at least parts which are substantially vertical and the conductive elements are held attached to the outer surface by the support material.

12. The method according to claim 10 wherein the support layer is formed from the same support material as the conductive layer.

13. The method according to claim 10 wherein the support material of the support layer and the conductive layer is applied to the outer surface by a jet of the support material mixed with a liquid carrier.

14. The method according to claim 13 wherein the support material is cellulose and the conductive elements are carbon particles mixed with the cellulose.

15. The method according to claim 1 wherein the connectors comprise metal plates which are covered on a side adjacent the outer surface and on a side remote from the outer surface by the conductive layer.

16. The method according to claim 1 wherein the electrolyte is a liquid.

17. The method according to claim 1 wherein the electrolyte contains additives for treating the concrete.

18. The method according to claim 1 wherein the electrolyte contains calcium hydroxide and lithium ions.

19. The method according to claim 1 wherein the conductive layer includes with said conductive elements a support material allowing the conductive layer to be driven over by vehicular traffic.

20. The method according to claim 19 wherein the support material is asphalt.

21. The method according to claim 19 wherein there is provided a porous layer under the conductive layer through which the electrolyte can pass.

22. The method according to claim 19 wherein the support material and the conductive layer is sufficiently porous to allow the penetration therethrough of the electrolyte to the outer surface.

* * * * *